United States Patent

Yoshida et al.

Patent Number: 5,443,756
Date of Patent: Aug. 22, 1995

[54] LIQUID CRYSTAL COMPOSITION

[75] Inventors: Tetsushi Yoshida, Hachioji; Yutaka Fujita, Urawa; Kunihiko Kotani, Gyoda, all of Japan

[73] Assignees: Casio Computer Co., Ltd.; Rodic Co., Ltd., both of Tokyo, Japan

[21] Appl. No.: 255,573

[22] Filed: Jun. 8, 1994

Related U.S. Application Data

[63] Continuation of Ser. No. 766,859, Sep. 27, 1991, abandoned.

[30] Foreign Application Priority Data

Oct. 1, 1990 [JP] Japan ................................. 2-260500

[51] Int. Cl.$^6$ ................................. C09K 19/30
[52] U.S. Cl. ................ 252/299.63; 252/299.01
[58] Field of Search ................ 252/299.01, 299.63

[56] References Cited

U.S. PATENT DOCUMENTS

| | | | |
|---|---|---|---|
| 4,629,581 | 12/1986 | Petrzilka et al. | 252/299.63 |
| 4,654,421 | 3/1987 | Tanaka et al. | 252/299.63 |
| 5,013,477 | 5/1991 | Buchecker et al. | 252/299.63 |
| 5,102,578 | 4/1992 | Buchecker et al. | 252/299.63 |
| 5,122,295 | 6/1992 | Weber et al. | 252/299.63 |

FOREIGN PATENT DOCUMENTS

| | | |
|---|---|---|
| 0261614 | 3/1988 | European Pat. Off. . |
| 0315050 | 5/1989 | European Pat. Off. . |
| 0331933 | 9/1989 | European Pat. Off. . |
| 3620633 | 1/1987 | Germany . |

*Primary Examiner*—Philip Tucker
*Attorney, Agent, or Firm*—Frishauf, Holtz, Goodman, Langer & Chick

[57] ABSTRACT

A liquid crystal composition contains 60 to 80 parts by weight of liquid crystal compounds represented by the following general formulas (1)–(3):

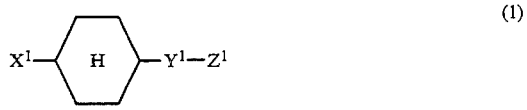

(1)

where $X^1$ is $CH_3CH=CHCH_2CH_2-$ when $Y^1$ is

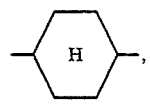

$CH_3CH=CH-$ or $CH_2=CHCH_2CH_2-$ when $Y^1$ is

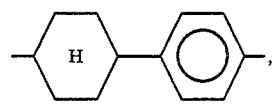

and $CH_3CH=CHCH_2CH_2-$ when $Y^1$ is

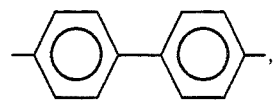

and $Z^1$ is alkoxy group having 1 to 5 carbon atoms when $Y^1$ is

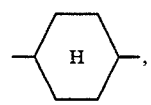

and alkyl group having 1 to 5 carbon atoms when $Y^1$ is

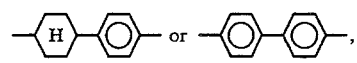

(2)

(Abstract continued on next page.)

-continued

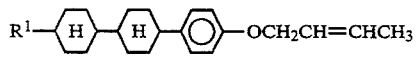

where R$^1$ is alkyl group having 3 or 4 carbon atoms, and

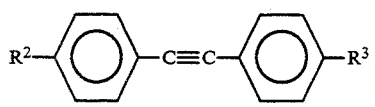
(3)

where R$^2$ is alkyl group having 1 to 5 carbon atoms, and R$^3$ is alkoxy group having 1 to 5 carbon atoms; and 20 to 30 parts by weight of at least one liquid crystal compound represented by the following general formula:

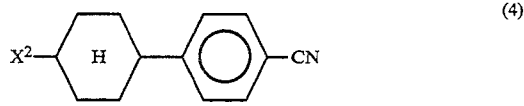
(4)

where X$^2$ is CH$_3$CH=CH— or CH$_3$CH=CHCH$_2$CH$_2$—. The composition contains at least 70 parts by weight of the liquid crystal compounds represented by formulas (1), (2) and (4).

12 Claims, No Drawings

LIQUID CRYSTAL COMPOSITION

This application is a Continuation, of application Ser. No. 07/766,859, filed Sep. 27, 1991 now abandoned.

BACKGROUND OF THE INVENTION

1. Field of the Invention

This invention relates to a liquid crystal composition for use in liquid-crystal displays of the field-effect type which are driven in a time-division fashion.

2. Description of the Related Art

Liquid-crystal displays are commonly used in various items of office equipment. It is demanded that a liquid-crystal display have a large screen, have many pixels, and display high-quality images. The most popular of these liquid-crystal displays is a simple-matrix type which not only has a simple structure but also can be driven by a relatively simple driver.

The liquid-crystal display of the simple-matrix type has a liquid-crystal cell. The liquid-crystal cell comprises a first substrate, a second substrate located parallel to the first substrate and spaced apart therefrom, stripe-shaped signal electrodes formed on the inner surface of the first substrate, stripe-shaped scanning electrodes formed on the inner surface of the second substrate and opposing and intersecting with the signal electrodes, and a liquid crystal twisted and sealed within the gap between the first and second substrate, forming a layer. Those portions of the liquid-crystal layer which are located at the intersections of the signal electrodes and the scanning electrodes function as pixels. The liquid-crystal display further has a pair of polarizing plates which sandwich the liquid-crystal cell.

To drive the liquid-crystal display, scanning signals are supplied to the selected ones of the scanning electrodes, and data signals are simultaneously supplied to the selected ones of the signal electrodes. As a result, those pixels which are located at the intersections of the selected scanning electrodes and the selected signal electrodes thereby are driven and allow the passage of light. This is how the liquid-crystal display is driven in a time-division fashion.

The more frequently the liquid-crystal display is driven in a time-division fashion, the smaller the operating margin of the display, i.e., the difference between the voltage applied to any pixel driven and the voltage applied to any pixel not driven. The smaller the operating margin, the lower the contrast of the image the liquid-crystal display displays, and, hence, the less the view angle the display has.

The conventional TN-type liquid-crystal display has but insufficient steepness in the changes of luminance which occur when voltages are applied to the pixels. The display is therefore driven at a time-division duty of, at most, 1/60. Consequently, it can not have so many pixels as to form a large screen or to display high-quality images.

Other types of liquid-crystal displays have been developed and put to practical use, which exhibit a greater steepness in the changes of luminance since the molecules of the liquid crystal are twisted by a larger angle than in the TN-type liquid-crystal display. They are generally known as a STN-type or a SBE-type, wherein the liquid crystal molecules have a twist angle ranging from 180° to 270°. The STN-type liquid-crystal display can be driven at a time-division duty of up to 1/200. However, this time-division duty is not sufficient for the 640×400 dot liquid-crystal display which has hitherto been used in great numbers. As a matter of fact, the 640×400 dot display consists of two sections, i.e., the upper and the lower, which are each driven at a time-division duty of 1/200.

Conventional liquid crystal compositions for use in liquid-crystal displays which are driven in a time-division fashion has four features, which enable the compositions to acquire sufficient steepness in the changes of luminance. The first is the great elastic constant ratio $K_{33}/K_{11}$, i.e., the ratio of bend elastic constant $K_{33}$ to splay elastic constant $K_{11}$. The second is the small dielectric constant ratio $\Delta\epsilon/\epsilon\perp$, i.e., the ratio of dielectric anisotropy $\Delta\epsilon$ to perpendicular dielectric constant $\epsilon\perp$ (namely, the dielectric constant measured in a line perpendicular to the long axis of liquid crystal molecules). The third feature is prominent dielectric anisotropy $\Delta\epsilon$. The fourth feature is the low viscosity.

More specifically, the liquid crystal composition for use in the conventional STN-type liquid-crystal display is a mixture of at least three liquid crystal compounds. The first compound, the content of which is 50% or more, has a cyano group and serves to increase the elastic constant ratio $K_{33}/K_{11}$ and also to decrease the voltage for driving the STN-type liquid crystal display. The second liquid crystal compound exhibits has ester bonds and a $\epsilon\perp$ value great enough to reduce the dielectric constant ratio $\Delta\epsilon/\epsilon\perp$. The third liquid crystal compound has low viscosity for adjusting the viscosity of the liquid crystal composition to a desired value.

The liquid crystal composition used in the conventional STN-type liquid-crystal display has drawbacks. Its first component, i.e., the liquid crystal compound having a cyano group, has high viscosity, inevitably increasing the viscosity of the liquid crystal composition. Its second component, i.e., the liquid crystal compound having ester bonds and a great $\epsilon\perp$ value for reducing the ratio $\Delta\epsilon/\epsilon\perp$, also has high viscosity, degrading the response speed of the liquid crystal cell. Moreover, the liquid crystal composition fails to form images of uniform contrast after a long, continuous use of the liquid-crystal display.

SUMMARY OF THE INVENTION

Accordingly, an object of the present invention is to provide a liquid crystal composition which has a high elastic constant ratio $K_{33}/K_{11}$, low dielectric constant ratio $\Delta\epsilon/\epsilon\perp$, and low a viscosity, and which remains a liquid crystal over a broad temperature range (hereinafter referred to as the "LC temperature range).

To attain the above objects, a liquid crystal composition according to the invention is characterized in three respects. First, it has a high content of a liquid crystal compound which has a high elastic constant ratio $K_{33}/K_{11}$, thus resulting in a sufficient elastic constant ratio $K_{33}/K_{11}$. Secondly, it has a low content of a liquid crystal compound which has a prominent dielectric anisotropy $\Delta\epsilon$, thus possessing a small dielectric constant ratio $\Delta\epsilon/\epsilon\perp$. Thirdly, it contains neither a liquid crystal compound having ester bonds, nor does it contain a heterocyclic compound.

More specifically, the liquid crystal composition of the invention comprises a total of 60 to 80 parts by weight of at least one liquid crystal compound represented by the following general formula (1), at least one liquid crystal compound represented by the following general formula (2) and at least one liquid crystal compound represented by the following general formula (3):

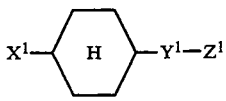    (1)

where $X^1$ is $CH_3CH=CHCH_2CH_2-$ when $Y^1$ is

, $CH_3CH=CH-$ or $CH_2=CHCH_2CH_2-$ when $y^1$ is

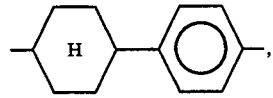, and $CH_3CH=CHCH_2CH_2-$ when $y^1$ is

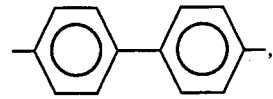, and $Z^1$ is alkoxy group having 1 to 5 carbon atoms when $y^1$ is

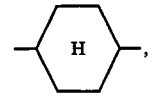, and alkyl group having 1 to 5 carbon atoms when $y^1$ is

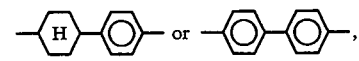    (2)

$R^1-$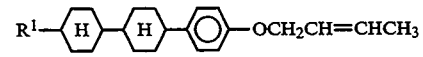$-OCH_2CH=CHCH_3$ where $R^1$ is alkyl group having 3 or 4 carbon atoms, and

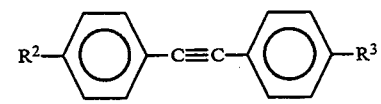    (3)

where $R^2$ is alkyl group having 1 to 5 carbon atoms, and $R^3$ is alkoxy group having 1 to 5 carbon atoms; and 20 to 30 parts by weight of at least one of liquid crystal compounds represented by the following general formula:

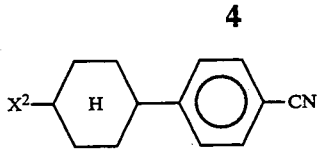    (4)

where $X^2$ is $CH_3CH=CH-$ or $CH_3CH=CHCH_2CH_2-$, wherein the composition contains at least 70 parts by weight of the liquid crystal compounds represented by formulas (1), (2) and (4).

DETAILED DESCRIPTION OF THE PREFERRED EMBODIMENTS

In order to drive a liquid crystal cell at duty of 1/400 to 1/480, two requirements must be satisfied. The first requirement is to twist the liquid crystal sealed in the cell, by an angle ranging from 80° to 270° (e.g., 240°). The second requirement is to use a liquid crystal composition which has a great elastic constant ratio (e.g., 1.75 or more) and a small dielectric constant ratio (e.g., 2 or less) and which, hence, exhibits sufficient steepness in the changes of luminance. Such a liquid crystal composition is, however, hard to twist by so large an angle as one ranging from 180° to 270°. To twist the composition by such a large angle, the composition must be preliminarily tilted by an angle of 6° or more (e.g., 8°). If the composition is so tilted preliminarily, the liquid crystal cell containing it will display images but in a non-uniform contrast, and the electro-optical characteristic of the composition will change with time, inevitably decreasing the reliability of the liquid crystal cell.

The inventors hereof conducted experiments, tests, and analyses on various liquid crystal compositions, in order to determine the best possible liquid crystal composition for providing a liquid crystal cell which can display images in uniform contrast and has high reliability. They have found that a composition which has, in addition to the above requirements, an average dielectric constant of 6, including a small perpendicular component (e.g., 4 or less) would be the best possible choice. Their finding is the basis of the present invention, which will be described, in more detail.

The liquid crystal compounds represented by the general formula (1) are those of various compounds having alkenyl groups, which have specific alkenyl groups having the specific structures of $CH_3CH=CH-$, $CH_3CH=CHCH_2CH_2-$ or $CH_2=CHCH_2CH_2-$. Among these liquid crystal compounds are the following ones:

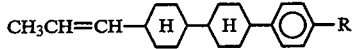

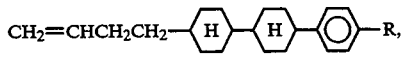

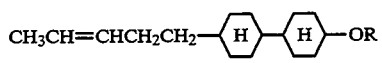

wherein R is a linear alkyl group having 1 to 5 carbon and atoms.

The liquid crystal compounds represented by the above three formulas each have a great elastic constant ratio $K_{33}/K_{11}$, and have a comparatively low viscosity. The liquid crystal composition according to the invention contains 30 to 55 parts by weight of one of these compound, and therefore has a sufficient elastic constant ratio $K_{33}/K_{11}$.

The liquid crystal compounds represented by the general formula (2) are used for adjusting the viscosity or LC temperature range of the liquid crystal composition according to the invention. They have a high N-I point. Of these compounds, the following ones are used, for example, which has alkenyl groups at the ends and a great elastic constant ratio $K_{33}/K_{11}$:

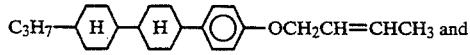

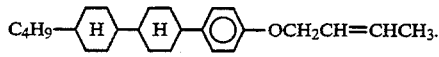

The liquid crystal composition according to the invention contains 7 parts by weight or more of one of these compounds, whereby its viscosity and its LC temperature range are appropriately adjusted.

The liquid crystal compounds represented by the general formula (3) have a prominent dielectric anisotropy $\Delta\epsilon$ and a relatively low viscosity. They are, for example:

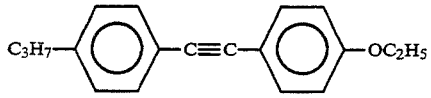

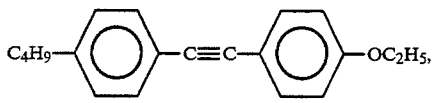

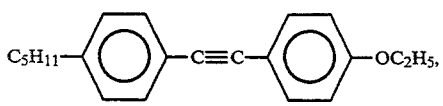

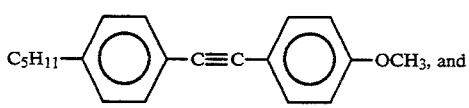

These liquid crystal compounds are used for two objectives. The first objective is to enhance the dielectric anisotropy $\Delta\epsilon$ of the composition, thereby a desired optical effect can be imparted to the liquid crystal cell even if the liquid crystal layer is relatively thin. The second objective is to increase the electric field strength of the liquid crystal cell and, hence, the response speed thereof. The content of the liquid crystal compounds of the general formula (3) ranges from 10 to 30 parts by weight.

The liquid crystal compounds represented by the general formula (4) have an alkenyl group and a cyano group at the ends thereof, respectively, have a great elastic constant ratio $K_{33}/K_{11}$, and exhibit a dielectric anisotropy $\Delta\epsilon$ of a positive value. Examples of these liquid crystal compounds are:

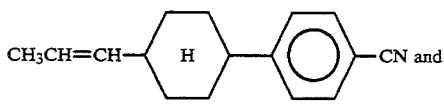

-continued

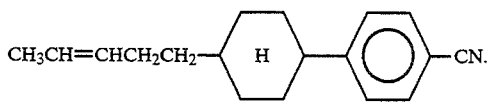

The compound of the general formula (4) are used to impart a great elastic constant ratio $K_{33}/K_{11}$ and a positive dielectric anisotropy $\Delta\epsilon$ to the liquid crystal composition position. Their content ranges from 20 to 30 parts by weight lest the composition should exhibit an excessively prominent dielectric anisotropy $\Delta\epsilon$.

The liquid crystal composition of the invention comprises 60 to 80 parts by weight of the compounds represented by the general formulas (1), (2) and (3), each used in the ratio specified above, and 20 to 30 parts by weight of at least one of liquid crystal compounds represented by the general formula (4). Further, the liquid crystal composition according to the invention can comprises at least 70 parts by weight of the liquid crystal compounds represented by the general formulas (1), (2), and (4). The composition of the invention is prepared to have a liquid crystal temperature of 0° to 80° C. (a N-I point of more than 80° C. and a melting point of less than 0° C.), and a viscosity of 30 cp or less (at 20° C.).

Since the liquid crystal composition of the invention has a large content of a liquid crystal compound which has a high N-I point, whose alkenyl group has a structure of $CH_3CH=CH-$, $CH_3CH=CHCH_2CH_2-$, or $CH_2=CHCH_2CH_2-$, it has a great elastic constant ratio $K_{33}/K_{11}$, and a relatively low viscosity. Therefore, the composition exhibits sufficient steepness in the changes of luminance, and is hence suitable for use in a liquid crystal display. Further, since the composition contains only 10 to 30 parts by weight of a liquid crystal compound having a cyano group, it has a small dielectric constant ratio $\Delta\epsilon/\epsilon\perp$. Owing to the small ratio $\Delta\epsilon/\Delta\perp$, the dielectric constant of the liquid crystal composition changes but very little, even if the molecules of the composition forming a layer have their orientation state changed. It follows that the strength of the electric field applied to the layer of this composition changes only a little, whereby the liquid crystal composition has sufficient steepness in the changes of luminance.

Moreover, the liquid crystal composition according to the invention can serve to provide a liquid crystal display having high reliability. This is because the composition contains neither a liquid crystal compound having ester bonds nor a heterocyclic compound having ester bonds, either having a great perpendicular dielectric constant $\Delta\perp$. Were the composition contains, for example, a liquid crystal compound having ester bonds and, hence, a great perpendicular dielectric constant $\epsilon\perp$, it should have a great $\epsilon\parallel$ value to exhibit positive dielectric anisotropy $\Delta\epsilon$ which is given as: $\epsilon\parallel - \epsilon\perp$. Since it does not contain liquid crystal compounds having a great $\epsilon\perp$, the liquid crystal composition of the invention has a small average dielectric constant $\bar{\epsilon}[\bar{\epsilon}=(\epsilon\parallel +2\epsilon\perp)/3]$ and, therefore, scarcely absorbs impurity ions. This is why the composition helps to provide a liquid crystal display having high reliability.

An example of the liquid crystal composition of the invention will now be described, which comprises the liquid compounds shown in Table 1.

The liquid crystal compounds were mixed in the mixing ratio specified in Table 1, thereby preparing a liquid crystal composition according to the present invention. This example had the physical properties shown in Table 2. A liquid crystal display was made, using this composition. The display exhibited the operating characteristics shown in Table 2 when driven by a 1/12 bias, at a time-division duty of 1/400 at the temperature of 25° C. The image contrast shown in Table 2 is one evaluated by seeing the image along a normal to the screen surface of the display. In Table 2, $V_{OP}$ is the voltage applied to the liquid crystal display, enabling the display to display images in the highest contrast.

A comparative liquid crystal composition was prepared by mixing the liquid crystal compounds specified in Table 3. The comparative composition had the physical properties shown in Table 4. A liquid crystal display was made, using the comparative composition. The display exhibited the operating characteristics when driven by a 1/12 bias, at a time-division duty of 1/400 at temperature of 25° C. The image contrast shown in Table 2 is one evaluated by seeing the image along a normal to the screen surface of the display. In Table 2, $V_{OP}$ is the voltage applied to the liquid crystal display, enabling the display to display images in the highest contrast.

As is evident from the comparison between Tables 2 and 3, unlike the comparative composition, the liquid crystal composition of the invention had an elastic constant ratio $K_{33}/K_{11}$ of more than 1.75, a dielectric constant ratio $\Delta\epsilon/\epsilon_\perp$ of less than 2.0, a sufficiently low viscosity, and a sufficiently broad LC temperature range. Having a layer of the composition having these good properties, the liquid crystal display displayed images in a high contrast of 47 when driven at a time-division duty of 1/400. In addition, since the the composition had an average dielectric constant $\bar{\epsilon}$ of 6 or less, the liquid crystal display remains reliable over a long period of continuous use. Further, since the composition contained tolane-series liquid crystal compounds, it exhibited a prominent refractive index anisotropy $\Delta n$. Hence, even a thin layer of this composition has a large electric field strength, and a liquid crystal cell incorporating such a thin composition layer can have a high response speed.

TABLE 1

(Example of the Invention)

| Liquid Crystal Compound | Content (wt %) |
|---|---|
| CH₃CH=CH—(H)—(H)—(O)—R | 13 |
| CH₂=CHCH₂CH₂—(H)—(H)—(O)—R | 13 |
| CH₃CH=CHCH₂CH₂—(H)—(H)—OR | 13 |
| C₃H₇—(H)—(H)—(O)—OCH₂CH=CH—aCH₃ | 3 |
| C₄H₉—(H)—(H)—(O)—OCH₂CH=CH—CH₂ | 4 |

TABLE 1-continued (Example of the Invention)

| Liquid Crystal Compound | Content (wt %) |
|---|---|
| C₃H₇—(O)—C≡C—(O)—OC₂H₅ | 4 |
| C₄H₉—(O)—C≡C—(O)—OC₂H₅ | 4 |
| C₅H₁₁—(O)—C≡C—(O)—OC₂H₅ | 4 |
| C₅H₁₁—(O)—C≡C—(O)—OCH₃ | 4 |
| CH₃CH=CH—(H)—(O)—CN | 15 |
| CH₃CH=CHCH₂CH₂—(H)—(O)—CN | 15 |
| CH₃O—CH₂CH₂CH₂—(H)—(H)—(O)—F | 8 |

TABLE 2

| Physical Properties of Example | |
|---|---|
| C - N point | −7° C. |
| N - I point | 110° C. |
| $\Delta n$ | 0.148 |
| $\Delta\epsilon/\epsilon_\perp$ | 1.89 |
| $\bar{\epsilon}$ | 5.7 |
| $K_{33}/K_{11}$ | 1.95 |
| Viscosity | 20 cp (20°) |
| $V_{op}$ | 33 V |
| Contrast | 47 |
| $t_{on} + t_{off}$ | 464 ms |

TABLE 3

(Comparative Example)

| Liquid Crystal Compound | Content (wt %) |
|---|---|
| C₂H₅—(O)—COO—(O)(F)—CN | 3 |
| C₃H₇—(H)—(O)—CN | 28 |
| CH₃CH₂CH₂CH=CH—(H)—(O)—CN | 14 |
| CH₃CH=CHCH₂CH₂—(H)—(O)—CN | 10 |
| CH₃CH=CH—(H)—(O)—CN | 10 |
| C₃H₇—(H)—COO—(O)—OCH₃ | 6 |
| C₃H₇—(H)—(O)—(O)—CH₂—OCH₃ | 6 |

TABLE 3-continued
(Comparative Example)

| Liquid Crystal Compound | Content (wt %) |
|---|---|
| C4H9—〈H〉—〈O〉—〈O〉—CH2—O—CH3 | 6 |
| C5H11—〈H〉—〈O〉—〈O〉—CH2—O—CH3 | 6 |
| C3H7—〈H〉—〈O〉—C≡C—〈O〉—C2H5 | 5 |
| C3H7—〈H〉—〈H〉—COO—〈O〉—〈H〉—C3H7 | 3 |
| C3H7—〈H〉—〈H〉—〈O〉—OCH2CH=CHCH3 | 3 |

TABLE 4
Physical Properties of Example

| | |
|---|---|
| N - I point | 91° C. |
| Δn | 0.150 |
| Δε/ε⊥ | 3.1 |
| ε | 8.7 |
| $K_{33}/K_{11}$ | 1.75 less |
| Viscosity | 24.2 cp (20° C.) |
| $V_{op}$ | 22.2 V |
| Contrast | 5 |
| $t_{on} + t_{off}$ | 500 ms or mor |

As has been described, the liquid crystal composition according to the present invention contains liquid crystal compounds having an alkenyl group, has a low content of liquid crystal compounds having a cyano group, and contains neither a liquid crystal compound having ester bonds nor a heterocyclic compound having ester bonds. The composition, therefore, has a great elastic constant ratio $K_{33}/K_{11}$, a small dielectric constant ratio Δε/ε⊥, a small average dielectric constant ε, and a low viscosity. The composition is suitable for use in a liquid crystal display which is driven at a high time-division duty. More specifically, a liquid crystal display having a layer of this composition can be driven at a time-division duty of 1/400, because the composition possesses great steepness in the changes of luminance.

What is claimed is:

1. A liquid crystal composition comprising:
   (a) a total of 60 to 80 parts by weight of at least one liquid crystal compound represented by the following formula (1), at least one liquid crystal compound represented by the following formula (2), and at least one liquid crystal compound represented by the following formula (3):

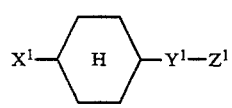 (1)

where $X^1$ is $CH_3CH=CHCH_2CH_2$— when $Y^1$ is

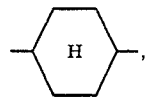, $CH_3CH=CH$— or $CH_2=CHCH_2CH_2$— when $Y^1$ is

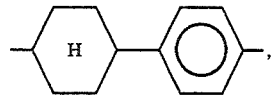, and $CH_3CH=CHCH_2CH$— when $Y^1$ is

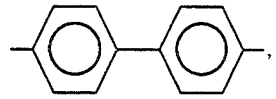, and $Z^1$ is an alkoxy group having 1 to 5 carbon atoms when $Y^1$ is

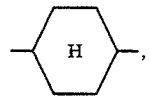, and an alkyl group having 1 to 5 carbon atoms when $Y^1$ is

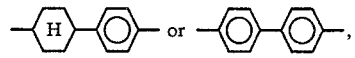 (2)

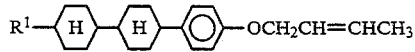

where $R^1$ is an alkyl group having 3 or 4 carbon atoms, and

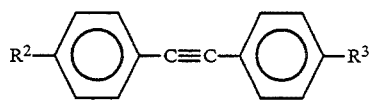 (3)

where $R^2$ is an alkyl group having 1 to 5 carbon atoms, and $R^3$ is an alkoxy group having 1 to 5 carbon atoms; and (b) 20 to 30 parts by weight of at least one liquid crystal compound represented by the following formula:

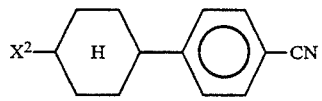 (4)

where $X^2$ is $CH_3CH=CH$— or $CH_3CH=CHCH_2CH_2$—, wherein said composition contains at least 70 parts by weight of the liquid crystal compounds represented by formulas (1), (2) and (4), said liquid crystal composition not containing a compound having an ester bond or a heterocyclic compound, said liquid crystal composition having an elastic constant ratio $K_{33}/K_{11}$ of 1.75 or more, a dielectric constant ratio $\Delta\epsilon/\epsilon\perp$ of 2.0 or less, a perpendicular dielectric constant $\epsilon\perp$ of 4 or less and an average constant $\bar{\epsilon}$ of 6 or less.

2. The composition according to claim 1, wherein the content of said liquid crystal compound represented by the formula (1) is from 30 to 55 parts by weight.

3. The composition according to claim 1, wherein the content of said liquid crystal compound represented by the formula (2) is 7 parts by weight or more.

4. The composition according to claim 1, wherein the content of said liquid crystal compound represented by the formula (3) is from 10 to 30 parts by weight.

5. The composition according to claim 1, wherein said liquid crystal compound represented by the formula (1) is one selected from the group consisting of:

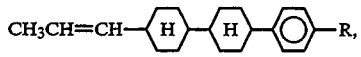

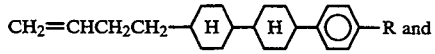

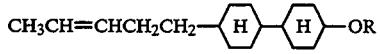

wherein R is a linear alkyl group having 1 to 5 carbon atoms.

6. The composition according to claim 1, wherein said liquid crystal compound represented by the formula (2) is one selected from the group consisting of:

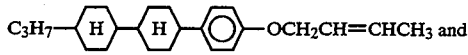

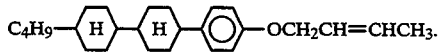

7. The composition according to claim 1, wherein said liquid crystal compound represented by the formula (3) is one selected from the group consisting of:

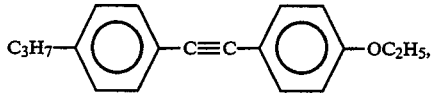

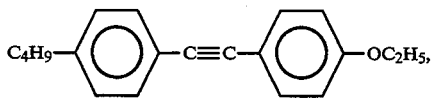

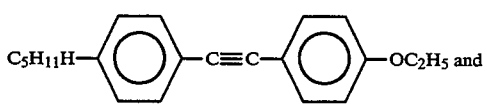

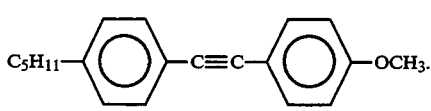

8. The composition according to claim 1, wherein said liquid crystal compound represented by the formula (4) is one selected from the group consisting of:

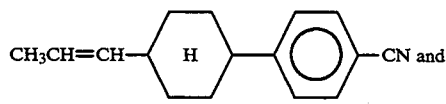

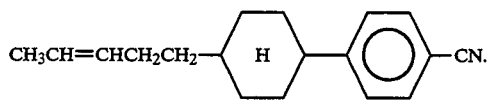

9. The composition according to claim 2, wherein the content of said liquid crystal compound represented by the formula (2) is in an amount of 7 parts by weight or more and the content of said liquid crystal compound represented by the formula (3) is in an amount of 10 to 30 parts by weight.

10. The composition according to claim 9, wherein said liquid crystal compound of the formula (1) is a compound selected from the group consisting of

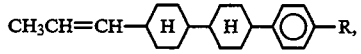

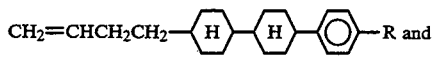

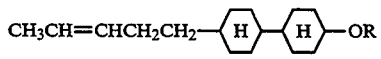

wherein R is a linear alkyl group having 1 to 5 carbon atoms, said liquid crystal compound of the formula (2) is a compound selected from the group consisting of

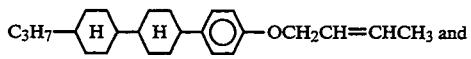

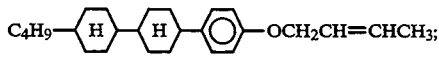

said liquid crystal compound of the formula (3) is a compound selected from the group consisting of

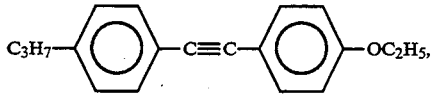

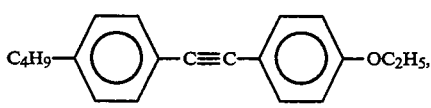

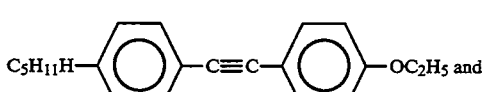

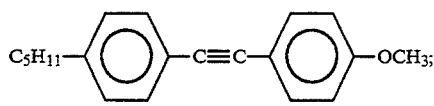

said liquid crystal compound of the formula (4) is a compound selected from the group consisting of

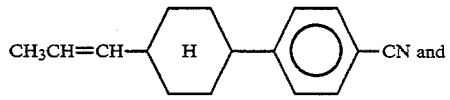

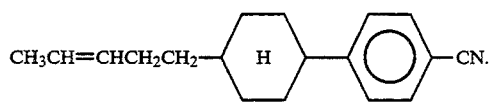

11. The composition according to claim 1, which has a liquid crystal temperature of 0° to 80° C. and a viscosity of 30 cp or less at 20° C.

12. A liquid crystal composition consisting essentially of 13 wt. % 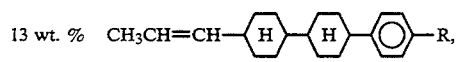

13 wt. % 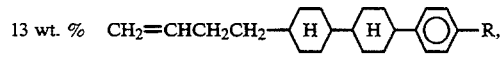

13 wt. % 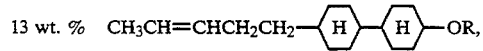

3 wt. % 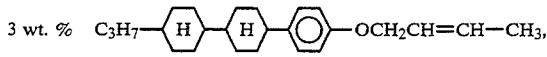

4 wt. % 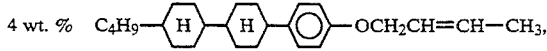

4 wt. % 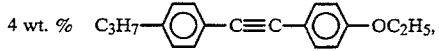

4 wt. % 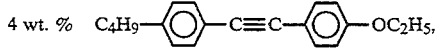

4 wt. % 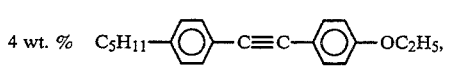

4 wt. % 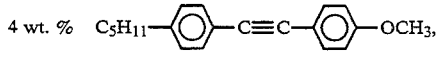

15 wt. % 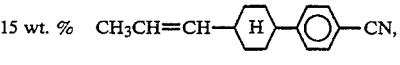

15 wt. % 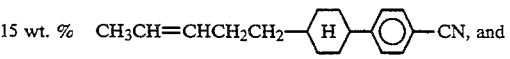

8 wt. % 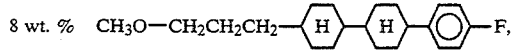

wherein R is a linear alkyl group having 1 to 5 carbon atoms, said liquid crystal composition not containing a compound having an ester bond or a heterocyclic compound, said liquid crystal composition having an elastic constant ratio $K_{33}/K_{11}$ of 1.75 or more, a dielectric constant ratio $\Delta\epsilon/\epsilon_\perp$ or 2.0 or less, a perpendicular dielectric constant $\epsilon_\perp$ of 4 or less and an average constant $\bar{\epsilon}$ of 6 or less.

* * * * *